No. 877,981.

PATENTED FEB. 4, 1908.

A. W. BEESON.
GLASS PRESSING AND BLOWING MACHINE.
APPLICATION FILED APR. 10, 1907.

3 SHEETS—SHEET 1.

WITNESSES.

INVENTOR.

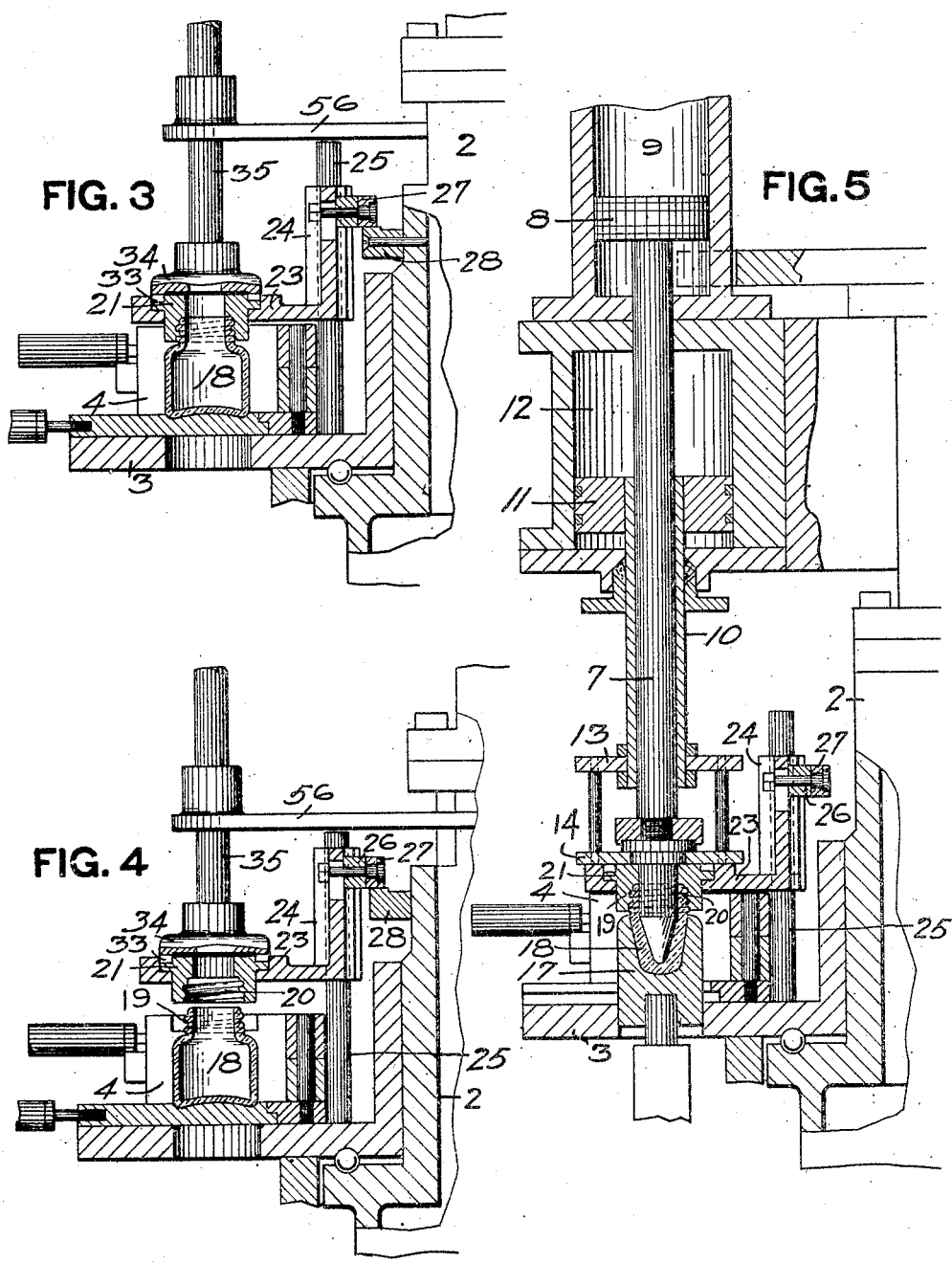

UNITED STATES PATENT OFFICE.

ARTHUR W. BEESON, OF WASHINGTON, PENNSYLVANIA, ASSIGNOR OF ONE-HALF TO GEORGE W. HENNING, OF WASHINGTON, PENNSYLVANIA.

GLASS PRESSING AND BLOWING MACHINE.

No. 877,981.   Specification of Letters Patent.   Patented Feb. 4, 1908.

Application filed April 10, 1907. Serial No. 367,357.

*To all whom it may concern:*

Be it known that I, ARTHUR W. BEESON, a resident of Washington, in the county of Washington and State of Pennsylvania, have invented a new and useful Improvement in Glass Pressing and Blowing Machines; and I do hereby declare the following to be a full, clear, and exact description thereof.

This invention relates to glass molding machines and more particularly to molding and blowing machines for forming bottles, jars and like articles with necks having external screw threads.

The object of the invention is to provide a machine of this character which operates automatically to produce a thread without seam or fin and free from distortion due to the action of the thread forming mold or ring on the plastic glass.

Certain glass articles, such as bottles, jars or the like, formed of glass or other plastic material are provided with an external thread or threads on their necks for receiving a suitable threaded closure. Heretofore such threads have been formed either by means of a partable threaded ring or mold, or by a continuous or seamless ring or mold. In the former case the parting of the mold leaves a slight fin or projection on the thread which is objectionable. The seamless or continuous ring mold is not open to this objection but heretofore such ring molds have been removed from the molded article either by hand, thus rendering the operation slow and expensive, or in a manner to put considerable strain upon the freshly molded threads, and as the glass is still somewhat plastic the threads are thereby distorted.

The present invention provides automatically operating mechanism for removing a seamless or continuous ring mold without danger of distorting the thread, and thus producing a perfect thread without fin or seam and in an expeditious manner.

The invention comprises the combination and arrangement of mechanism hereinafter described and claimed.

While the invention is described herein particularly with reference to the formation of glass bottles or jars, it will be understood that it is not limited thereto, but is applicable to apparatus for molding any plastic material, whether glass or other plastic material, or for forming articles other than bottles or jars, or even other than hollow ones.

Figure 1:
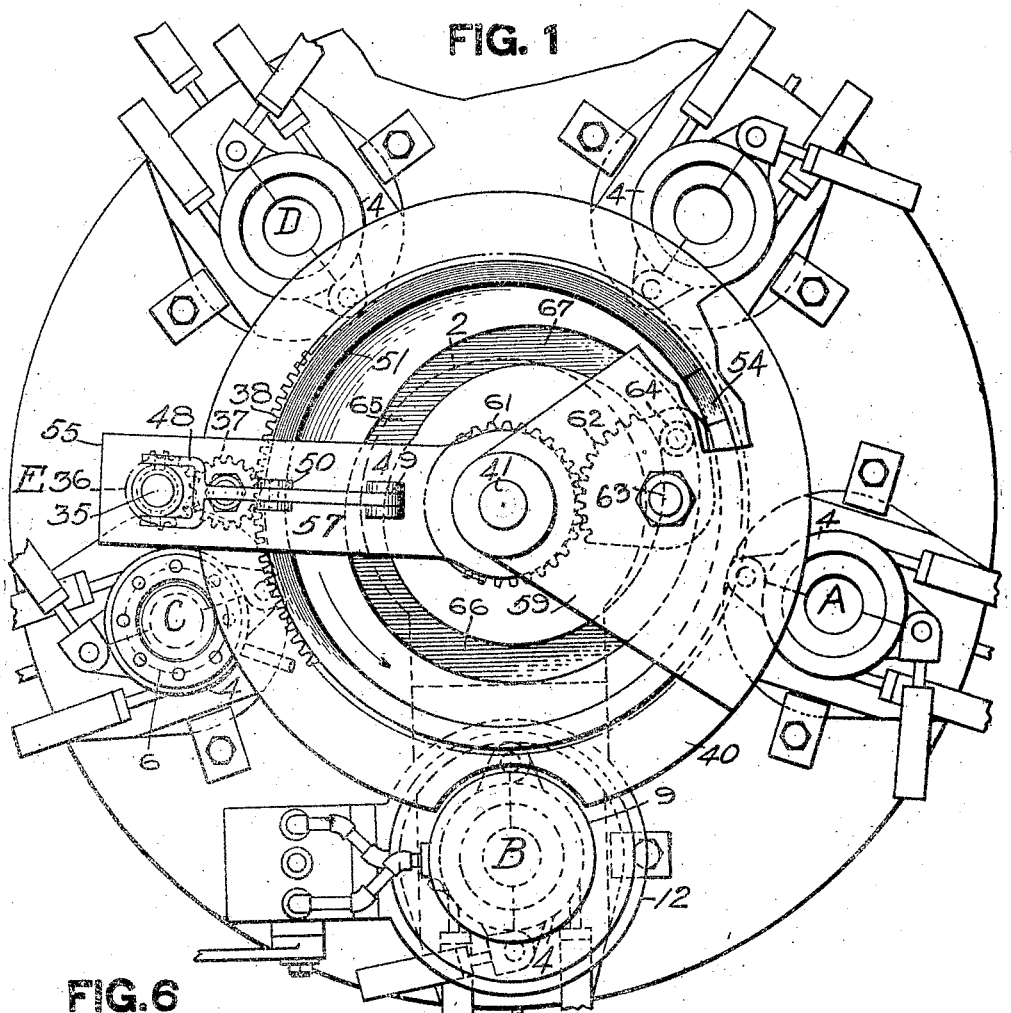
Figure 6:
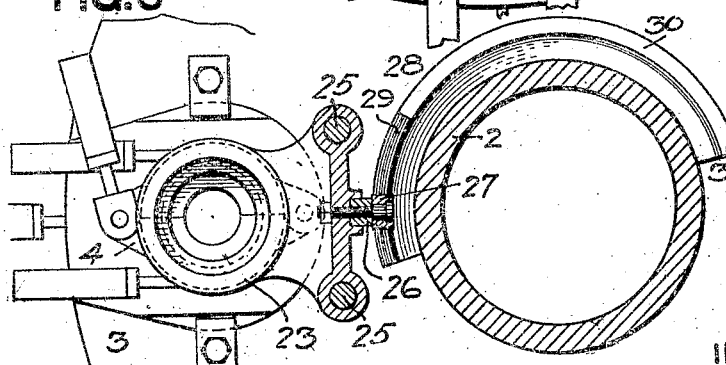
Figure 7:
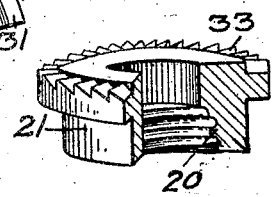
Figure 2:
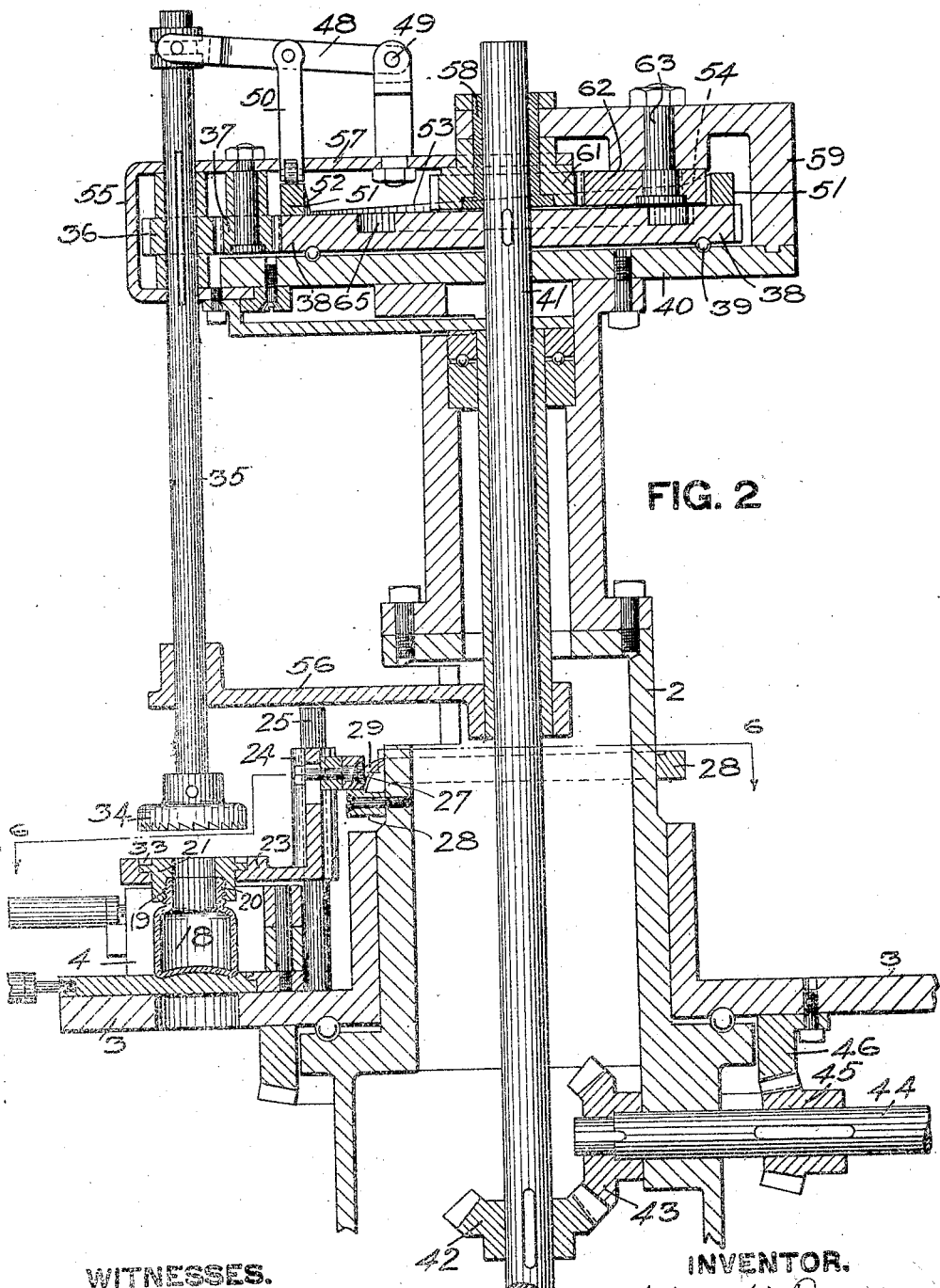

In the accompanying drawings Figure 1 is a plan view of a glass molding machine embodying the invention; Fig. 2 is a central vertical section thereof; Figs. 3 and 4 are views of a portion of Fig. 2 showing the parts in different positions; Fig. 5 is a vertical section through a mold, mold raising means and plunger; Fig. 6 is a horizontal sectional detail on the line 6—6, Fig. 2; and Fig. 7 is a broken away perspective view of the ring mold.

The machine selected for purposes of illustrating the invention is one type of the "blue" bottle molding and blowing machine to which the improvements have been applied. The machine shown comprises a suitable base or support (not shown) having a central standard 2 around which is the revolving table 3. This table carries a series of molds 4, usually five in number, those shown being of a well known partable type. The table is also provided with suitable indexing mechanism, not shown, and is operated in the usual manner of operating these tables, that is, given an intermittent rotary movement.

The standard 2 carries the pressing and blowing apparatus, the latter being shown at 6, while the presser or plunger 7 is connected to a piston 8 working in a double acting power cylinder 9. Surrounding the upper portion of the plunger 7 is a hollow piston rod 10 connected to a piston 11 working in the double acting power cylinder 12. This hollow piston rod carries the usual spring follower plate 13 for actuating the follower ring 14 of glass molding machines. The cylinders 9 and 12 are controlled by a suitable valve connecting said cylinders to a source of fluid pressure, such as compressed air, and so arranged as to admit the air first to the top of the cylinder 12, then to the top of the cylinder 9, then into the bottom of the cylinder 9, and then into the bottom of the cylinder 12, so as to first depress the ring follower, then depress the plunger 7, then raise the plunger 7, and then raise the ring follower. Inasmuch as valves suitable for performing the several functions enumerated are old and well known, and especially as a large variety of valve mechanisms may be adapted for this purpose, such valve has not been illustrated. Obviously any other mechanism than that described may be used for depressing and elevating the plunger 7 and follower ring 14.

The molds 4 will be provided with the usual appurtenances characteristic of this type of machine but they form no part of this invention and are not described. As shown, the mold is provided with the bottom or lower follower 17 for shaping the molten glass during the pressing operation, and the plunger 7 has its lower end shaped so as to press the body of glass down into the mold to form the pressed glass article 18 having a neck provided with threads 19, these threads being formed by the internal threads 20 formed in a seamless or continuous ring mold 21.

The parts of the machine so far described are all old and may be of any suitable type and as they form no part of the present invention they have not been shown or described in detail.

The operation of such machine will be well understood by those skilled in the art, the mold carrying table being rotated intermittently either by hand or by suitable mechanism and the molds brought in succession underneath the pressing and blowing devices. In operation the gathering of glass is cut into a mold at the station A, the mold with a gathering of glass therein then moved underneath the pressing plunger 7 at station B where it is pressed, then moved underneath the blower at station C where it is blown, and then moved to the station D where the finished article is removed. The present invention relates to the removal of the ring mold 21 from the blown article and this takes place preferably between stations C and D, being accomplished by automatically operating mechanism now to be described.

The ring mold 21 is rotatably mounted in a suitable carrying member 23 which is substantially of ring form and is provided with sleeve portions 24 vertically movable on and guided by stationary studs 25 carried by the table 1, one pair of such studs and one such ring carrier and ring mold being provided for each mold 4. Secured to a sleeve 24 of the ring carrier is a suitable projection 26 preferably carrying a small friction reducing roller 27 which rides on a cam ledge 28 secured to the column 2 and extending partially around the same. This cam ledge for a portion of its length, as at 29, is upwardly inclined so that when the roller 27 rides along the same, as the mold is being carried around by the table, the mold is slowly raised at a rate corresponding to the lift of the ring mold while being rotated and unscrewed from the threads on the article; another portion 30 of the ledge is horizontal so that in the further rotation of the table the ring mold is carried in its elevated position so as to permit the opening of the mold to permit the removal of the article and the closing of said mold, and then said ledge comes to an end, preferably by sloping rapidly downwardly as at 31, thereby permitting the ring mold to fall by gravity or otherwise into position in the mold, this taking place before the mold reaches the station A where a fresh gathering of glass is cut into the mold.

The rotation of the ring mold 21 is effected by providing said ring with ratchet teeth 33 adapted to be engaged by a coöperating ratchet head 34 formed on the lower end of a vertical rotating shaft 35. The latter is rotated by being provided with a gear 36 driven, preferably by an intermittent idler pinion 37, from a large gear wheel 38 mounted at the upper part of the frame, preferably on ball bearings 39 running in a race formed in a top plate 40 secured to the standard 2. The gear wheel 38 is secured to a shaft 41 which extends down through the center of the column and below the table has secured thereto a miter gear 42 meshing with a similar gear 43 on a short shaft 44, the latter also having secured thereto a bevel gear 45 meshing with a large bevel gear 46 formed on or secured to the lower face of the table 1. Consequently the rotation of the table, either by power or by hand in the operation of the machine, imparts rotary movement to the shaft 41 and from the latter to the shaft 35. Consequently the shaft 35 is rotated whenever the table is moved so that when its ratchet head 34 is brought into engagement with the ratchet teeth formed on the ring mold the latter is rotated in a direction to unscrew the same from the glass article contained therein, this rotation being effected at the time when the roller 27 rides up the inclined portion 29 of the ledge 28, so that the unscrewing of the ring mold takes place simultaneously with the raising or lifting thereof.

In order to cause the ratchet head 34 on the shaft 35 to engage the ratchet teeth on the ring mold, it is necessary to lower said shaft 35 upon the ring mold. This is effected by giving to said shaft a slight vertical movement, such as forming a splined connection with the pinion 36 and connecting to the upper end of said shaft one end of a lever 48 pivoted at 49 and provided with a rod 50 upon a cam 51 formed on the upper face of the wheel 38, so that in the rotation of the latter the cam 51 passes underneath the rod 50 and effects the raising and lowering of the shaft 35, said cam being formed with a portion 52 to lower the shaft 35 to bring the ratchet head 34 into engagement with the ratchet teeth on the mold, a portion 53 to then slowly raise the shaft 35 simultaneously with and to the same extent as the lifting of the ring mold itself by the cam portion 29 of the ledge 28, and portion 54 to then rapidly raise the shaft 35 still further in order to disengage the ratchet head 34 from the ring mold and to hold said shaft elevated until it is again time to lower the same onto the next succeeding ring mold.

The unscrewing of the ring mold is effected while the mold is traveling between stations C and D and consequently the shaft 35 must travel with the mold and must then be brought back in order to engage the next succeeding ring mold, this engagement being effected shortly after the ring mold leaves station C, say at station E. To effect this oscillating movement of the spindle 35 the latter is mounted in a frame 55 having the lower bearing arm 56 and the upper bearing arm 57. The latter is mounted loosely on a sleeve 58 which surrounds the upper end of the shaft 41 but which is itself non-rotatable, being clamped or otherwise secured to a bracket 59 secured to the frame plate 40 and overhanging the arm 57 and gear 38. The arm 57 has formed thereon or secured thereto a gear wheel or gear segment 61 which also surrounds the sleeve 58. Meshing with the gear 61 is another gear wheel or gear segment 62 loosely mounted on a stud 63 which depends from the overhanging bracket 59. The gear segment 62 is provided with a stud 64 which projects down into a cam groove 65 formed in the upper face of the wheel 38. When the wheel 38 rotates the cam groove 65 is carried around and on account of its shape causes the pin 64 to move toward and from the center of the wheel 38, thereby imparting rotary movement to the gear or segment 62 and this in turn imparts a similar movement to the gear or segment 61 to which the arm 57 is fixed. Consequently, the arm 57 is caused to oscillate back and forth, carrying the shaft 35 from station D to station E and then back again, as will be readily understood. The cam groove 65 is provided with a long portion 66 which is only slightly eccentric to the center of said cam, this portion of the cam groove being for the purpose of effecting the slow oscillation of the frame 55 and shaft 35 from station E to station D, thus causing said shaft to travel slowly along with the mold and while the ring mold is being unscrewed. Slightly before station D is reached, the ratchet head on the shaft 35 is entirely disengaged from the ring mold and either before the table stops at station D, or when it again begins to move after leaving station D, the shaft is brought back rapidly to station E, this being effected by the portion 67 of the cam groove which is sharply eccentric to the axis of the cam and effects the rapid swinging of the arm 57 to return the shaft 35 to position E ready to engage the next succeeding ring mold. The gears 42, 43, 45 and 46 are so proportioned as to give five (more or less, according to the number of molds) complete rotations to the shaft 41 and cam wheel 38 for each complete rotation of the table 1, or what amounts to the same thing, to give a complete rotation to the cam wheel 38 during the time that a mold travels from station A to station B, or from station B to station C, or from station C to station D.

The operation of the machine is as follows: We will suppose that a ring 21 is seated in its mold and is at station A. The gathering of glass is cut into the mold and the table then rotated to bring the mold to station B where the table pauses, the follower ring 14 lowered onto the ring mold 21 to hold it in position while the glass is being pressed, and the plunger 7 depressed to press the glass in the mold and form the neck of the article within the ring mold 29, thus forming external threads on said neck. As soon as the pressing plunger 7 and follower ring 14 are raised the table is again rotated, bringing the mold to station C where the blower is brought into operation to blow the article. During all of this time the neck of the glass article is in contact with the metallic ring mold 21 so that by the time the blowing is completed, the glass neck has hardened sufficiently to prevent distortion of the threads when removing the ring mold. The table is then again rotated, carrying the mold with the blown article from position C toward station D. As soon as it has moved a short distance the cam 51 on the cam wheel 38 permits the shaft 35 to drop so as to bring its ratchet head 35 into engagement with the ratchet teeth 33 on the ring mold 21. As the table is now traveling, the shaft 35 is being rotated by means of the gearing described and therefore imparts a rotary movement to the ring mold in a direction to unscrew the same from the neck of the glass article. Simultaneously therewith the roller 27 rides up the cam portion 29 of the ledge 28, thus lifting the ring mold as rapidly as required by the pitch of the threads on the neck of the article, and entirely relieving the threads from all strain due to the raising of the ring mold. By the time the mold has reached station D the ring mold will have been entirely disengaged from the neck of the article and the shaft 35 is then given a rapid upward movement, thereby disengaging its ratchet head from the ratchet teeth on the ring mold. During the movement from station E to station D the pin 64 on the gear segment 62 has been moving in the portion 66 of the cam groove 65, thus swinging the arm 57 slowly and moving the shaft 35 along at the same rate of speed as the travel of the mold. When the shaft 35 is disengaged from the ring mold the pin 64 reaches the sharply inclined portion 67 of the cam groove 65 and the segment or gear 62 is then given a rapid rotation in the opposite direction from its former rotation, thereby swinging the arm 57 rapidly in the opposite direction and carrying the shaft 35 rapidly back to station E in position to be lowered down upon the next succeeding ring mold. Inasmuch as the cam wheel 38 rotates once for each one-fifth (more or less, according to the number of molds on the table) of the rotation of the table 1 the cam 51 will have arrived at the proper position to again lower the shaft 35 as soon as the next succeeding ring mold reaches station E. When the shaft 35 is disengaged from the ring mold, the latter continues to travel around with the table in its elevated position, being held in that position by the roller 27 running on the horizontal portion 30 of the ledge 28. During this period the mold is opened, the article removed and the mold again closed, and before the mold again reaches station A the roller 27 runs off the ledge 28, thereby permitting the ring mold to drop down upon the mold proper and in position to receive a fresh gathering of glass, when the foregoing operations are repeated.

The machine described operates automatically, requiring no attention or operations other than usually given to this type of molding and blowing machines, the operator merely seeing that the table is indexed or rotated at the proper time and that the pressing plunger and blowing device are brought into action at the proper time. The entire movements of disengaging the ring mold from the glass article and again lowering the same into position on the mold is effected automatically and requires no attention on the part of the operator. The ring mold is seamless or continuous and therefore forms a thread without the objectionable fin or seam. Furthermore, said ring mold remains upon the article for a sufficient length of time to permit the glass threads to thoroughly set or chill so that there is no danger of distortion by sagging after the ring is removed, and the removal of the ring is effected by a positive lifting and rotating movement, thus entirely relieving the threads from strain during this operation.

In case the article to be formed is not to be blown, the blowing attachment can of course be omitted without in any manner affecting the operation of the other parts.

The invention may be applied to the formation of articles of plastic material other than glass and the claims are intended to cover all such uses.

The invention is largely in the form of an attachment which can be readily applied to any existing machine. For instance, with the "blue" machine it is merely necessary to add underneath the table the gearing for rotating the central vertical shaft, mount the latter in the column which usually is hollow, and apply to the upper portion of the column the necessary supports and operating mechanism for the vertical shaft.

What I claim is:

1. Molding apparatus comprising in combination, a mold support, a mold stationary on said support and including a vertically movable internally threaded ring, a coöperating presser, and automatic mechanism movable to engage said ring and rotate it and simultaneously lift the same.

2. Molding apparatus comprising in combination, a mold support, a mold stationary on said support and including a vertically movable internally threaded ring, a coöperating presser, mechanism movable to engage said ring and rotate the same, and independent means for raising said ring while being rotated and subsequently lowering the same.

3. Molding apparatus comprising in combination, a mold support, a mold stationary on said support and including a vertically movable internally threaded ring, a coöperating presser, mechanism movable to engage said ring and arranged to rotate the same, and a cam arranged to raise said ring while being rotated and to subsequently lower the same.

4. Molding apparatus comprising in combination, a carrier, a series of molds on said carrier and each including a vertically movable internally threaded ring, a coöperating presser with which the molds are successively brought into relation, and mechanism traveling with the molds and arranged to engage the rings and rotate and simultaneously lift the same.

5. Molding apparatus comprising in combination, a carrier, a series of molds on said carrier and each including a vertically movable internally threaded ring, a coöperating presser with which the molds are successively brought into relation, mechanism traveling with the molds and arranged to engage the rings and rotate the same, and independent mechanism for raising said rings while being rotated.

6. Molding apparatus comprising in combination, an internally threaded ring mold, a carrier therefor, a coöperating presser, mechanism for rotating said ring mold while being moved by said carrier, and a stationary cam arranged to raise said mold while being rotated.

7. Molding apparatus comprising in combination, an internally threaded ring mold, a carrier therefor, a coöperating presser, automatic mechanism for rotating said ring mold while being moved by the carrier, and a stationary cam arranged to lift said mold while being rotated and then to lower the same.

8. Molding apparatus comprising in combination, an internally threaded ring mold, a coöperating presser, mechanism for rotating said ring mold, independent means for raising said mold while being rotated, and means for simultaneously raising the rotating mechanism.

9. Molding apparatus comprising in combination, an internally threaded ring mold, a coöperating presser, and automatic mechanism for rotating said ring mold, said automatic mechanism being arranged to lift in proportion to the pitch of the thread.

10. Molding apparatus comprising in combination, an internally threaded ring mold, a coöperating presser, mechanism for rotating said ring mold, and cams arranged to lift said ring mold while being rotated and correspondingly lifting the rotating mechanism.

11. Molding apparatus comprising in combination, an internally threaded ring mold, a coöperating presser, rotating mechanism for the mold comprising a vertical driven shaft arranged to engage the mold, means for raising the mold while being rotated, and means for simultaneously and correspondingly raising the vertical shaft.

12. Molding apparatus comprising in combination, a series of internally threaded ring molds, a coöperating presser, a carrier for the molds arranged to bring them successively into relation with the presser, automatic mechanism for rotating the molds, means for raising the molds while being rotated, and means for simultaneously lifting the mold rotating means.

13. Molding apparatus comprising in combination, a series of internally threaded ring molds, a coöperating presser, a mold carrier, a vertical shaft arranged to engage the molds and rotate the same, and mechanism arranged to simultaneously lift the mold and vertical shaft while rotating.

14. Molding apparatus comprising in combination, a series of internally threaded ring molds, a coöperating presser, a carrier for the molds, automatic mechanism for rotating said molds while being moved by the carrier, and a cam arranged to raise the molds while being rotated and to then lower the same.

15. Molding apparatus comprising in combination, a series of internally threaded ring molds, a coöperating presser, a mold carrier, mold rotating mechanism, and means for lowering the same to engage the mold and to raise the same while rotating said mold.

16. Molding apparatus comprising in combination, a series of internally threaded ring molds, a coöperating presser, a mold carrier, a vertical driven shaft provided with means for engaging the molds, means for raising the molds while being rotated, and mechanism for lowering the vertical shaft to engage the molds and to lift the same with the mold while being rotated.

17. Molding apparatus comprising in combination, a series of threaded molds, a carrier therefor, mold rotating mechanism common to said series of molds and mounted to travel with the same while rotating the molds, and automatic mechanism arranged to move said rotating mechanism with the molds while traveling and to return the same to normal position.

18. Molding apparatus comprising in combination, a series of internally threaded molds, a carrier therefor, rotating mechanism arranged to engage the molds, and a cam arranged to move said rotating mechanism with the molds while traveling and to return the same to normal position.

19. Molding apparatus comprising in combination, a series of threaded molds, a rotating carrier therefor, mold rotating mechanism arranged to engage the molds, an oscillating frame in which said mold rotating mechanism is mounted, and automatic means for moving said frame alternately in opposite directions to cause the mold rotating means to travel with the molds and to then return to normal position.

20. Molding apparatus comprising in combination, a series of threaded molds, a rotating carrier therefor, a vertical driven shaft having means for engaging the molds, means arranged to lower said shaft to engage the molds and to raise the same to disengage the molds, a movable carrier for said shaft, and automatic mechanism for moving said carrier to move said shaft with the molds while rotating the same to return to normal position after releasing the mold.

21. Molding apparatus comprising in combination, a series of threaded molds, a rotating driven mechanism arranged to engage the molds, a movable frame in which said rotating mechanism is mounted, and a cam wheel arranged to lower the rotating mechanism into engagement with the mold, to move the same with the mold while rotating the same, to disengage the same from the mold, and to then return the rotating mechanism to normal position.

22. Molding apparatus comprising in combination, a rotating table, a threaded mold carried thereby, a driven vertical shaft arranged to engage said mold, means for rotating the mold while being raised, and cam mechanism arranged to lower said shaft to engage the mold, to move said shaft along with the mold, to raise said shaft from said mold and return the shaft to its normal position.

23. Molding apparatus comprising in combination, a series of threaded molds, a rotating carrier therefor, driven mechanism arranged to engage the molds and rotate the same, mechanism for raising the mold while being rotated, mechanism for lowering the rotating mechanism to engage with the mold, to raise the same while the mold is being raised, and to further raise the same to disengage the mold, and mechanism for moving said rotating mechanism along with the mold while rotating the same, and for returning the mold rotating mechanism to normal position.

24. Molding apparatus comprising in combination, a threaded mold, a rotating carrier therefor, mold rotating mechanism arranged to engage the mold, an oscillating frame carrying said rotating mechanism, a gear or segment on said oscillating frame, a coöperating segment or gear, and a cam arranged to oscillate said segment or gear.

25. Molding apparatus comprising in combination, a rotating table, a series of threaded molds carried thereby, a shaft arranged to engage the mold, driving connections between said shaft and the rotating table, and automatic mechanism arranged to move said shaft with the molds while rotating and to move said shaft into and out of engagement with the mold.

26. Molding apparatus comprising in combination, a rotating table, a series of threaded molds carried thereby, a vertical shaft arranged to engage the molds, driving connections between the same and the table, a movable frame in which said shaft is mounted, and cam mechanism arranged to lower said shaft into engagement with the mold, to raise the mold and shaft while rotating, to move the shaft along with the mold while being rotated, and to return the shaft to normal position.

In testimony whereof, I the said ARTHUR W. BEESON have hereunto set my hand.

ARTHUR W. BEESON.

Witnesses:
ROBERT C. TOTTEN,
J. R. KELLER.